US011665195B2

(12) United States Patent
Ibrahim et al.

(10) Patent No.: US 11,665,195 B2
(45) Date of Patent: May 30, 2023

(54) SYSTEM AND METHOD FOR EMAIL ACCOUNT TAKEOVER DETECTION AND REMEDIATION UTILIZING ANONYMIZED DATASETS

(71) Applicant: Barracuda Networks, Inc., Campbell, CA (US)

(72) Inventors: Mohamed Hosam Afifi Ibrahim, San Jose, CA (US); Marco Schweighauser, Foster City, CA (US); Asaf Cidon, San Francisco, CA (US)

(73) Assignee: Barracuda Networks, Inc., Campbell, CA (US)

( * ) Notice: Subject to any disclaimer, the term of this patent is extended or adjusted under 35 U.S.C. 154(b) by 368 days.

(21) Appl. No.: 16/949,864

(22) Filed: Nov. 17, 2020

(65) Prior Publication Data
US 2021/0075824 A1  Mar. 11, 2021

Related U.S. Application Data

(63) Continuation-in-part of application No. 16/947,074, filed on Jul. 16, 2020, now Pat. No. 11,159,565, which is a continuation of application No. 16/363,596, filed on Mar. 25, 2019, now Pat. No. 10,778,717, which is a continuation-in-part of
(Continued)

(51) Int. Cl.
*H04L 29/06* (2006.01)
*H04L 9/40* (2022.01)
*G06F 9/54* (2006.01)
*G06N 5/02* (2023.01)
(Continued)

(52) U.S. Cl.
CPC .......... *H04L 63/1466* (2013.01); *G06F 9/546* (2013.01); *G06N 5/02* (2013.01); *H04L 51/046* (2013.01); *H04L 51/212* (2022.05); *H04L 63/1416* (2013.01)

(58) Field of Classification Search
CPC ... H04L 63/1416; H04L 63/14; H04L 51/212; H04L 51/42; H04L 63/1466; H04L 63/1425
See application file for complete search history.

(56) References Cited

U.S. PATENT DOCUMENTS 8,566,938 B1  10/2013  Prakash et al.
8,667,593 B1   3/2014  Shnitzer
(Continued)

*Primary Examiner* — Brandon Hoffman
*Assistant Examiner* — William A Corum, Jr.

(57) ABSTRACT

A new approach is proposed to support account takeover (ATO) detection based on login attempts by users. The approach relies on assessing fraudulence confidence level of login IP addresses to classify the login attempts by the users. A plurality of attributes/features in one or more user login data logs are extracted and used to build a labeled dataset for training a machine learning (ML) model that relies on statistics of the login attempts to classify and detect fraudulent logins. These attributes make it possible to ascertain if a login attempt or instance by a user is suspicious based on the ML model. In some embodiments, the ML model is trained using anonymized user login data to preserve privacy of the users and a proper level of data anonymization is determined based on the ML model's accuracy in detecting the ATO attacks when trained with different versions of the anonymized data.

21 Claims, 4 Drawing Sheets

Related U.S. Application Data application No. 15/693,318, filed on Aug. 31, 2017, now abandoned.

(60) Provisional application No. 63/037,988, filed on Jun. 11, 2020, provisional application No. 62/778,250, filed on Dec. 11, 2018.

(51) Int. Cl.
*H04L 51/046* (2022.01)
*H04L 51/212* (2022.01)

(56) References Cited

U.S. PATENT DOCUMENTS

| | | | |
|---|---|---|---|
| 8,819,823 B1 | 8/2014 | Banerjee | |
| 9,154,514 B1 | 10/2015 | Prakash | |
| 9,501,746 B2 | 11/2016 | Prakash | |
| 9,560,069 B1 | 1/2017 | Agarwal et al. | |
| 9,633,201 B1 | 4/2017 | Katz | |
| 9,774,626 B1 | 9/2017 | Himler et al. | |
| 10,148,683 B1 * | 12/2018 | Lin | H04W 12/06 |
| 10,158,657 B1 * | 12/2018 | Bray | H04L 67/535 |
| 10,666,666 B1 | 5/2020 | Saurabh | |
| 2003/0051026 A1 | 3/2003 | Carter et al. | |
| 2003/0088792 A1 | 5/2003 | Card et al. | |
| 2005/0022008 A1 | 1/2005 | Goodman et al. | |
| 2006/0149821 A1 | 7/2006 | Rajan et al. | |
| 2007/0136810 A1 | 6/2007 | Waltermann et al. | |
| 2011/0296003 A1 | 12/2011 | McCann et al. | |
| 2012/0110174 A1 | 5/2012 | Wootton et al. | |
| 2015/0288717 A1 | 10/2015 | Bringsjord | |
| 2016/0014151 A1 | 1/2016 | Prakash | |
| 2016/0344770 A1 | 11/2016 | Verma et al. | |
| 2017/0214701 A1 | 7/2017 | Hasan | |
| 2017/0230323 A1 | 8/2017 | Jakobsson | |
| 2017/0251006 A1 | 8/2017 | LaRosa et al. | |
| 2018/0033089 A1 | 2/2018 | Goldman et al. | |
| 2018/0091453 A1 | 3/2018 | Jakobsson | |
| 2018/0152471 A1 | 5/2018 | Jakobsson | |
| 2018/0225605 A1 | 8/2018 | Fabara et al. | |
| 2018/0232741 A1 | 8/2018 | Jadhav et al. | |
| 2018/0359280 A1 | 12/2018 | Elworthy | |
| 2018/0375877 A1 | 12/2018 | Jakobsson et al. | |
| 2019/0018956 A1 | 1/2019 | Sadaghiani et al. | |
| 2019/0028503 A1 | 1/2019 | LaRosa et al. | |
| 2019/0108334 A1 | 4/2019 | Sadaghiani et al. | |
| 2019/0132273 A1 | 5/2019 | Ryan et al. | |
| 2019/0199745 A1 | 6/2019 | Jakobsson et al. | |
| 2020/0067976 A1 | 2/2020 | Jakobsson | |
| 2021/0021612 A1 | 1/2021 | Higbee | |
| 2021/0058395 A1 | 2/2021 | Jakobsson | |
| 2021/0226987 A1 | 7/2021 | Summers et al. | |

* cited by examiner

SYSTEM AND METHOD FOR EMAIL ACCOUNT TAKEOVER DETECTION AND REMEDIATION UTILIZING ANONYMIZED DATASETS

CROSS-REFERENCE TO RELATED APPLICATIONS

This application claims the benefit of U.S. Provisional Patent Application No. 63/037,988, filed Jun. 11, 2020, which is incorporated herein in its entirety by reference.

This application is a continuation-in-part of U.S. patent application Ser. No. 16/947,074, filed Jul. 16, 2020, which is a continuation of U.S. patent application Ser. No. 16/363,596, filed Mar. 25, 2019, now U.S. Pat. No. 10,778,717, which claims the benefit of U.S. Provisional Patent Application No. 62/778,250, filed Dec. 11, 2018, and is a continuation-in-part of U.S. patent application Ser. No. 15/693,318, filed Aug. 31, 2017, all of which are incorporated herein in their entireties by reference.

BACKGROUND

Cyber criminals are increasingly utilizing social engineering and deception to successfully conduct wire fraud and extract sensitive information from their targets. Spear phishing, also known as Business Email Compromise, is a cyber fraud where the attacker impersonates an employee and/or a system of the company by sending emails from a known or trusted sender in order to induce targeted individuals to wire money or reveal confidential information, is rapidly becoming the most devastating new cybersecurity threat. The attackers frequently embed personalized information in their electronic messages including names, emails, and signatures of individuals within a protected network to obtain funds, credentials, wire transfers and other sensitive information. Countless organizations and individuals have fallen prey, sending wire transfers and sensitive customer and employee information to attackers impersonating, e.g., their CEO, boss, or trusted colleagues. Note that such impersonation attacks do not always have to impersonate individuals, they can also impersonate a system or component that can send or receive electronic messages. For a non-limiting example, a networked printer on a company's internal network has been used by the so-called printer repo scam to initiate impersonation attacks against individuals of the company.

One specific type of attacks, email account takeover (ATO), where an attacker steals credentials of an email account and uses the email account to attack accounts of other internal and/or external users, has been on the rise. According to a recent report issued by FBI, over $12 billion worth of assets have been lost due to business email account takeover and compromise incidents. ATO is a type of identity fraud, which hits an all time high with 16.7 million U.S. victims in 2017. In an ATO, an attacker gets illegitimate access to a user's account through a malicious login. Detecting the compromised user accounts and stopping the attackers before data is ex-filtrated, destroyed, or the account is used in nefarious actions is the goal for ATO prevention and remediation. In some cases, an ATO can be detected through monitoring organizations' internal email traffic and classifying malicious emails sent from one employee to another within the same organization. An ATO can also be detected using statistical behavior features extracted from graph topology including but not limited to, success out-degree proportion, reverse page-rank, recipient clustering coefficient and legitimate recipient proportion. Another method of login-based detections is to monitor the login attempts for employees and building models to find suspicious activity such as irregular login locations, times, devices, or browsers.

Existing email security solutions, however, are ineffective at detecting these attacks because the emails launched from the compromised accounts come from a legitimate sender, and therefore headers of the emails contain no malicious signals. Specifically, while the approaches mentioned above are able to detect ATO in some scenarios, there exist multiple other scenarios where the attacker activity emulates a legitimate user's behavior, which renders the attack undetected. One non-limiting example of such attack scenarios is the password spraying attack, detection relies on collecting user login data on a large-scale. While it is appealing to publish or share such data, disclosing such data comes with privacy concerns. As such, data owners have to anonymize attributes of user login data to avoid any potential privacy loss before disclosing the data. The effect of data anonymization on accuracy of machine learning models trained on the disclosed data, however, has never been addressed. Even worse, traditional email security solutions are typically located at the gateway or firewall to the internal network, e.g., they reside between the external network and the organization's email server, and thus cannot monitor or stop internal emails. An efficient approach to deal with email account takeover attacks is needed.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

Figure 1:
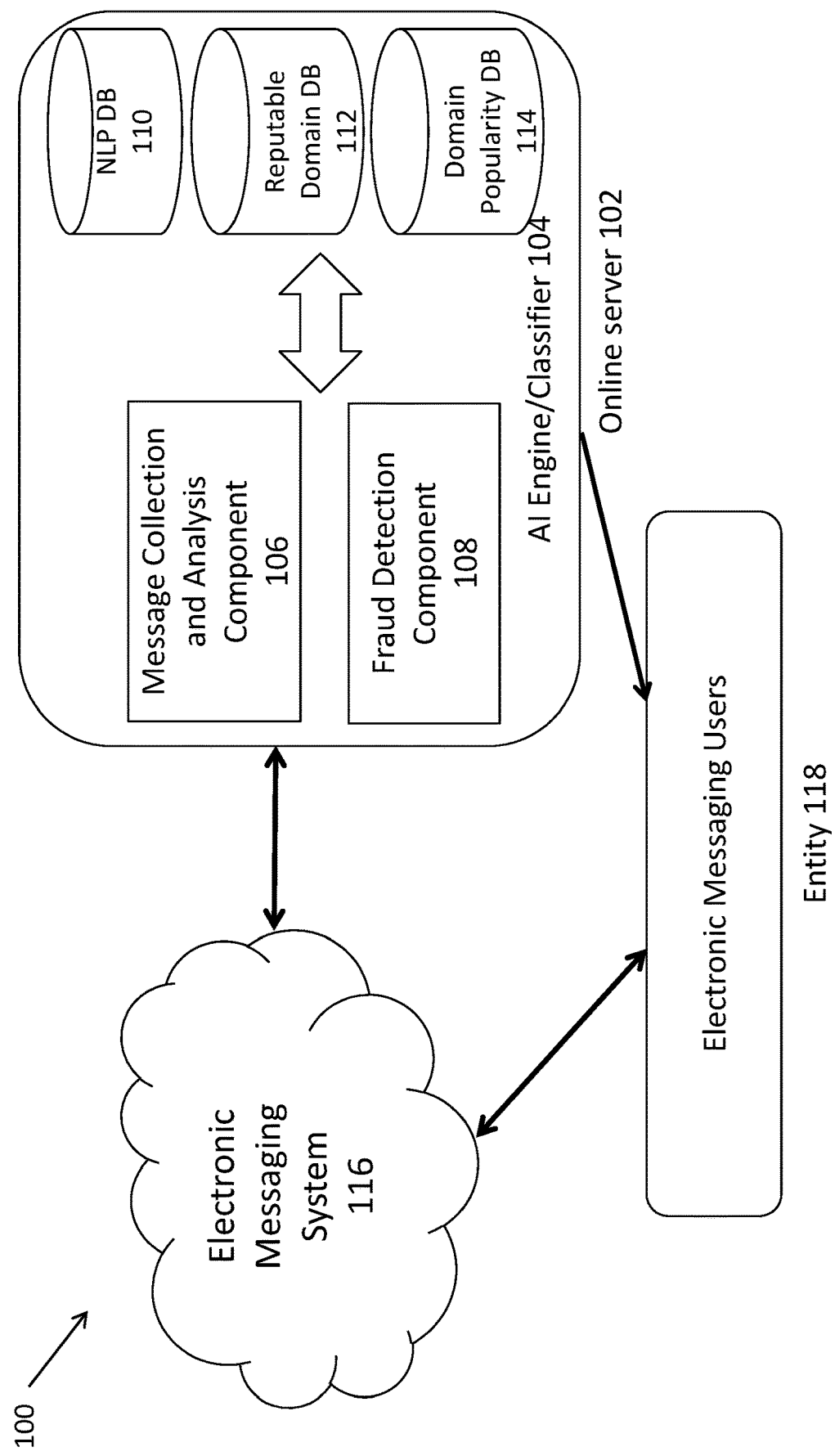
FIG. 1 depicts an example of a system diagram to support email account takeover detection and remediation in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support email account takeover detection and remediation by utilizing an artificial intelligence (AI) engine/classifier that detects and remediates such attacks in real time. The AI engine is configured to continuously monitor behaviors and identify communication patterns of an individual user on an electronic messaging system/communication platform of an entity/organization via application programming interface (API) call(s) to the electronic messaging system. Based on the identified communication patterns, the AI engine is configured to collect and utilize a variety of features and/or signals from an email sent from an internal email account of the entity, including but not limited to identities/identifications of the sender and recipients of the email, forwarding rules and IP logins to the email account, information about links embedded in the email as a function of how likely the links are to appear in the entity. The AI engine combines these signals to automatically detect whether the email account has been compromised by an external attacker and alert the individual user of the account and/or a system administrator accordingly in real time. In addition, the AI engine enables the parties to remediate the effects of the compromised email account by performing one or more of: searching for all malicious emails sent from the compromised email account, deleting or quarantining such emails from mailboxes of their recipients, notifying the recipients of the emails, and remediating any mailbox rules that the attacker may have setup on the compromised email account.

Compared to traditional gateway-based security systems that only monitor and filter external communications, the proposed approach is capable of collecting and examining internal as well as external electronic messages exchanged with parties outside of the entity to identify communication patterns of the email account of the user within the entity. The proposed approach is further capable of detecting anomalous activities and email account takeover attempts in real-time, not offline or in hindsight, and allowing the user and/or administrator of the email account to promptly remediate the adverse effects of the compromised account.

As used hereinafter, the term "user" (or "users") refers not only to a person or human being, but also to a system or component that is configured to send and receive electronic messages and is thus also subject to an email account takeover attack. For a non-limiting example, such system or component can be but is not limited to a web-based application used by individuals of the entity.

FIG. 1 depicts an example of a system diagram 100 to support email account takeover detection and remediation. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least an AI engine/classifier 104 having a message and analysis component 106 and a fraud detection component 108, and a plurality of databases including but not limited to a natural language processing (NLP) database 110, a reputable domain database 112, and a domain popularity database 114, each running on one or more computing unit/appliance/hosts/server 102 with software instructions stored in a storage unit such as a non-volatile memory (also referred to as secondary memory) of the computing unit for practicing one or more processes. When the software instructions are executed, at least a subset of the software instructions is loaded into memory (also referred to as primary memory) by one of the computing units of the host 102, which becomes a special purposed one for practicing the processes. The processes may also be at least partially embodied in the host 102 into which computer program code is loaded and/or executed, such that, the host becomes a special purpose computing unit for practicing the processes. When implemented on a general-purpose computing unit, the computer program code segments configure the computing unit to create specific logic circuits.

In the example of FIG. 1, each host 102 can be a computing device, a communication device, a storage device, or any computing device capable of running a software component. For non-limiting examples, a computing device can be but is not limited to a laptop PC, a desktop PC, a tablet PC, or an x86 or ARM-based a server running Linux or other operating systems.

In the example of FIG. 1, the electronic messaging system 116 can be but is not limited to, Office365/Outlook, Slack, LinkedIn, Facebook, Gmail, Skype, Google Hangouts, Salesforce, Zendesk, Twilio, or any communication platform capable of providing electronic messaging services to (e.g., send, receive, and/or archive electronic messages) to users within the entity 118. Here, the electronic messaging system 116 can be hosted either on email servers (not shown) associated with the entity 118 or on services/servers provided by a third party. The servers are either located locally with the entity 118 or in a cloud over the Internet. The electronic messages being exchanged on the electronic messaging system 116 include but are not limited to emails, instant messages, short messages, text messages, phone call transcripts, and social media posts, etc.

In the example of FIG. 1, the host 102 has a communication interface (not shown), which enables the AI engine 104 and/or the databases 110, 112, and 114 running on the host 102 to communicate with electronic messaging system 116 and client devices (not shown) associated with users within an entity/organization/company 118 following certain communication protocols, such as TCP/IP, http, https, ftp, and sftp protocols, over one or more communication networks (not shown). Here, the communication networks can be but are not limited to, internet, intranet, wide area network (WAN), local area network (LAN), wireless network, Bluetooth, WiFi, and mobile communication network. The physical connections of the network and the communication protocols are well known to those of skill in the art. The client devices are utilized by the users within the entity 118 to interact with (e.g., send or receive electronic messages to and from) the electronic messaging system 116, wherein the client devices reside either locally or remotely (e.g., in a cloud) from the host 102. In some embodiments, the client devices can be but are not limited to, mobile/handheld devices such as tablets, iPhones, iPads, Google's Android devices, and/or other types of mobile communication devices, PCs, such as laptop PCs and desktop PCs, and server machines.

During the operation of the system 100, the AI engine 104 runs continuously on the host 102. As soon as one or more new/incoming messages or emails have been sent internally by one user within the entity 114 from an email account on the electronic messaging system 116 to another user within the entity 114, the message collection and analysis component 106 of the AI engine 104 is configured to collect such new electronic messages sent as well as any new login attempt and/or any new mailbox rule change to the email account in real time. In some embodiments, the message collection and analysis component 106 is configured to collect the electronic messages before the intended recipients of the electronic messages in the entity 118 receive it. In some embodiments, the AI engine 104 is optionally authorized by the entity/organization 118 via online authentication protocol (OATH) to access the more electronic messaging system 116 used by the users of the entity 118 to exchange electronic messages. In some embodiments, the message collection and analysis component 106 is configured to retrieve the electronic messages automatically via programmable calls to one or more Application Programming Interfaces (APIs) to the electronic communication system 116. Such automatic retrieval of electronic messages eliminates the need for manual input of data as required when, for a non-limiting example, scanning outgoing emails in relation to data leak prevention ("DLP") configured to scan and identify leakage or loss of data. Through the API calls, the message collection and analysis component 106 is configured to retrieve not only external electronic messages exchanged between the users of the entity 118 and individual users outside of the entity 118, but also internal electronic messages exchanged between users within the entity 118, which expands the scope of communication fraud detection to cover the scenario where security of one user within the entity 118 has been compromised during, for a non-limiting example, an email account takeover attack.

In some embodiments, the message collection and analysis component 106 is configured to identify communication patterns of each user based on collected electronic messages sent or received by the user on the electronic messaging system 116 over a certain period time, e.g., day, month, year, or since beginning of use. The electronic messages collected over a shorter or more recent time period may be used to identify a recent communication patterns of the user while the electronic messages collected over a longer period of time can be used to identify more reliable longer term communication patterns. In some embodiments, the message collection and analysis component 106 is configured to collect the electronic messages from an electronic messaging server (e.g., an on-premises Exchange server) by using an installed email agent on the electronic messaging server or adopting a journaling rule (e.g., Bcc all emails) to retrieve the electronic messages from the electronic messaging server (or to block the electronic messages at a gateway).

In some embodiments, the message collection and analysis component 106 is configured to use the unique communication patterns identified to examine and extract various features or signals from the collected electronic messages for email account takeover detection. For non-limiting examples, the electronic messages are examined for one or more of names or identifications of sender and recipient(s), email addresses and/or domains of the sender and the recipient(s), timestamp, and metadata of the electronic messages, forwarding rules and IP logins to the email account, information about links embedded in the emails as a function of how likely the links are to appear in the entity 118. In some embodiments, the message collection and analysis component 106 is further configured to examine content of the electronic messages to extract sensitive information (e.g., legal, financial, position of the user within the entity 118, etc.)

In some embodiments, the fraud detection component 108 is configured to first clean up content of the email sent from the email account by removing any headers, signatures, salutations, disclaimers, etc. from the mail. The fraud detection component 108 is then configured to utilize one or more of the following features and/or criteria that are unique to the email account to make a determination of whether the email account has been compromised (e.g., taken over by an attacker) or not:

Number of embedded links in the email sent by the email account;
Length of the longest URL in the email sent by the email account;
How likely is every single word in the email sent by the account associated with a malicious email according to the NLP database 110;
Is any of the domains in the email sent by the email account likely to be malicious, using both the scores from the reputable domain database 112 and/or the domain popularity database 114;
IP logins to the email account;
Mailbox rule changes to the email account.

In the example of FIG. 1, the NLP database 110 is configured to maintain a score for each word wherein the score represents the likelihood of the word to be associated with malicious (phishing) emails. In some embodiments, the fraud detection component 108 is configured to compute term frequency-inverse document frequency (TF-IDF) of each word offline based on a corpus of labeled malicious emails and a corpus of innocent emails to determine the likelihood of the word being malicious.

In the example of FIG. 1, the reputable domain database 112 is configured to store the likelihood of domains being legitimate for the entity 118. In some embodiments, the reputable domain database 112 includes domains that have been seen by the message collection and analysis component 106 in internal communications more than a certain number of times over a certain period of time (e.g., the last few days). If a certain domain has been seen in internal communications often during a short period of time, it is deemed to be legitimate as it is unlikely to be associated with a phishing link even if the domain a relatively unpopular domain.

In the example of FIG. 1, the domain popularity database 114 is configured to maintain statistics on popularity of domains of the electronic messages across the internet. The less popular a domain in the electronic messages is, the more likely the domain is to be a phishing link.

In some embodiments, the fraud detection component 108 is configured to detect anomalous signals/features in attributes, metadata and/or content of the retrieved electronic messages for email account takeover detection. Here, the anomalous signals include but are not limited to, a same sender using another email address for the first time, replying to someone else in the email/electronic message chain, or sudden change in number of recipients of an electronic message.

In some embodiments, the fraud detection component 108 of the AI engine 104 is configured to detect the fraudulent incoming messages that are part of a longer conversation that includes more than one electronic message, e.g., a chain of emails. Rather than simply examining the first message of the conversation, the fraud detection component 108 is configured to monitor all electronic messages in the conversation continuously in real time and will flag an electronic message in the conversation for block or quarantine at any point once a predetermined set of anomalous signals are detected.

Based on the feature and/or signals discussed above, the fraud detection component 108 is configured to determine with a high degree of accuracy whether the email account is compromised by an email account takeover attack or other kinds of communication fraud and/or former/ongoing network threats, which include but are not limited to a personalized phishing attempt which entices the recipient to click on a link which may ask them to enter their credentials or download a virus, or an attacker hijacking an internal account and using it to communicate with other users in the organization or external parties.

If the fraud detection component 108 determines that the email account has been compromised, it is configured to block (remove, delete, modify) or quarantine electronic messages sent from the compromised email account in real time, and automatically notify the user, intended recipient(s) of the electronic message and/or an administrator of the electronic communication system 116 of the email account takeover attack. In addition, the fraud detection component 108 enables the notified parties to remediate the email account takeover incident by allowing them to search for any malicious emails sent from the compromised email account, delete or quarantine such emails from mailboxes of their recipients, notify the recipients of those emails, and delete and/or reset any malicious mailbox rules, e.g., inbox forwarding rules, which the attacker may have setup on the compromised email account.

Figure 2:
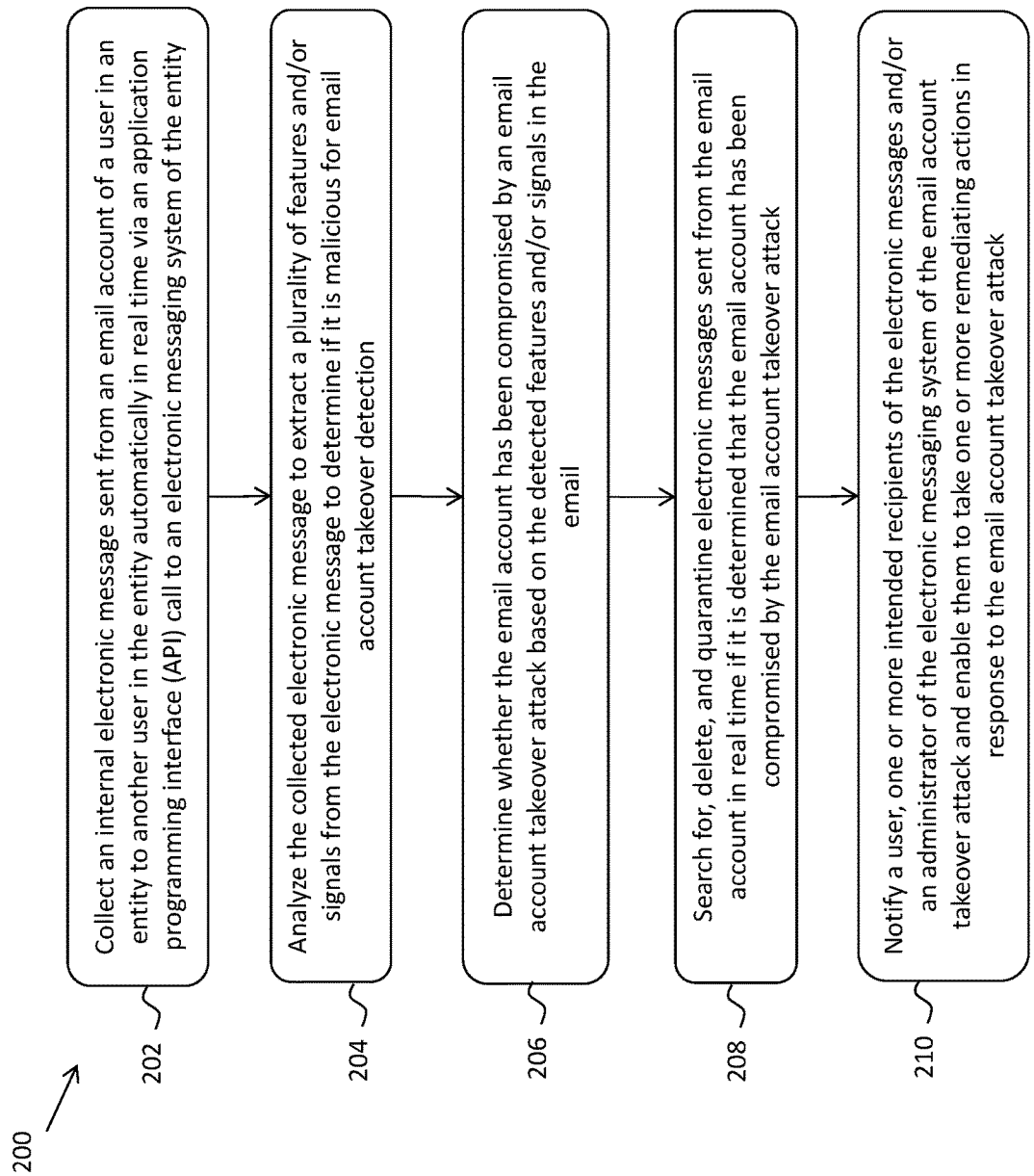
FIG. 2 depicts a flowchart of an example of a process to support email account takeover detection and remediation in accordance with some embodiments.

FIG. 2 depicts a flowchart 200 of an example of a process to support email account takeover detection and remediation. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where an internal electronic message sent from an email account of a user in an entity to another user in the entity automatically is collected in real time via an application programming interface (API) call to an electronic messaging system of the entity. The flowchart 200 continues to block 204, where the collected electronic message is analyzed to extract a plurality of features and/or signals from the electronic message to determine if it is malicious for email account takeover detection. The flowchart 200 continues to block 206, where the email account is determined with a high degree of accuracy as whether it has been compromised by an email account takeover attack based on the detected features and/or signals in the email. The flowchart 200 continues to block 208, where electronic messages sent from the email account are searched, blocked, and quarantined in real time if it is determined that the email account has been compromised by the email account takeover attack. The flowchart 200 ends at block 210, where a user, one or more intended recipients of the electronic messages and/or an administrator of the electronic messaging system are notified of the email account takeover attack and are enabled to take one or more remediating actions in response to the email account takeover attack.

In some embodiments, a new privacy-preserving machine learning (ML) mechanism to user login-based account takeover (ATO) detection is proposed, which is configured to detect ATO attacks based on login attempts by users. Specifically, the proposed approach relies on assessing fraudulence confidence level of login IP addresses to classify the login attempts by the users. In some embodiments, a plurality of attributes/features in one or more user login data logs are extracted and used to build a labeled dataset for training a machine learning (ML) model that relies on statistics of the login attempts to classify and detect fraudulent logins. Here, the plurality of features include but are not limited to one or more of the IP address and/or the user of a login, a field that provides information about a device and/or a browser used in the login. These attributes make it possible to ascertain if a login attempt or instance by a user is suspicious based on the ML model. For a non-limiting example, if the IP address is used in a considerable number of failed login attempts and very few successful login attempts, the IP address tends to be a suspicious IP. Additionally, if the IP address shows up across multiple entities/companies with the same behavior, it is a confirmation that the IP address is illegitimate. Furthermore, if information of the browser used for the login is suspicious, it is another confirmation that the login attempt is an ATO attack activity rather than a random activity of a legitimate user.

Under the proposed approach, the ML model is trained using anonymized user login data to preserve privacy of the users. In some embodiments, any drop in the ML model's accuracy in terms of detecting the ATO attacks as a consequence of the data anonymization is measured. A proper level of data anonymization can be determined based on the ML model's accuracy in detecting the ATO attacks when trained with different versions of the anonymized data. With the ML model trained with the proper level of anonymized data, the proposed approach is able to achieve a balance between accuracy of ATO attack detection while preserving user data privacy. In addition, the proposed approach is also applicable to train the ML model using incomplete (instead of anonymized) user login data for ATO attack detection.

Figure 3:
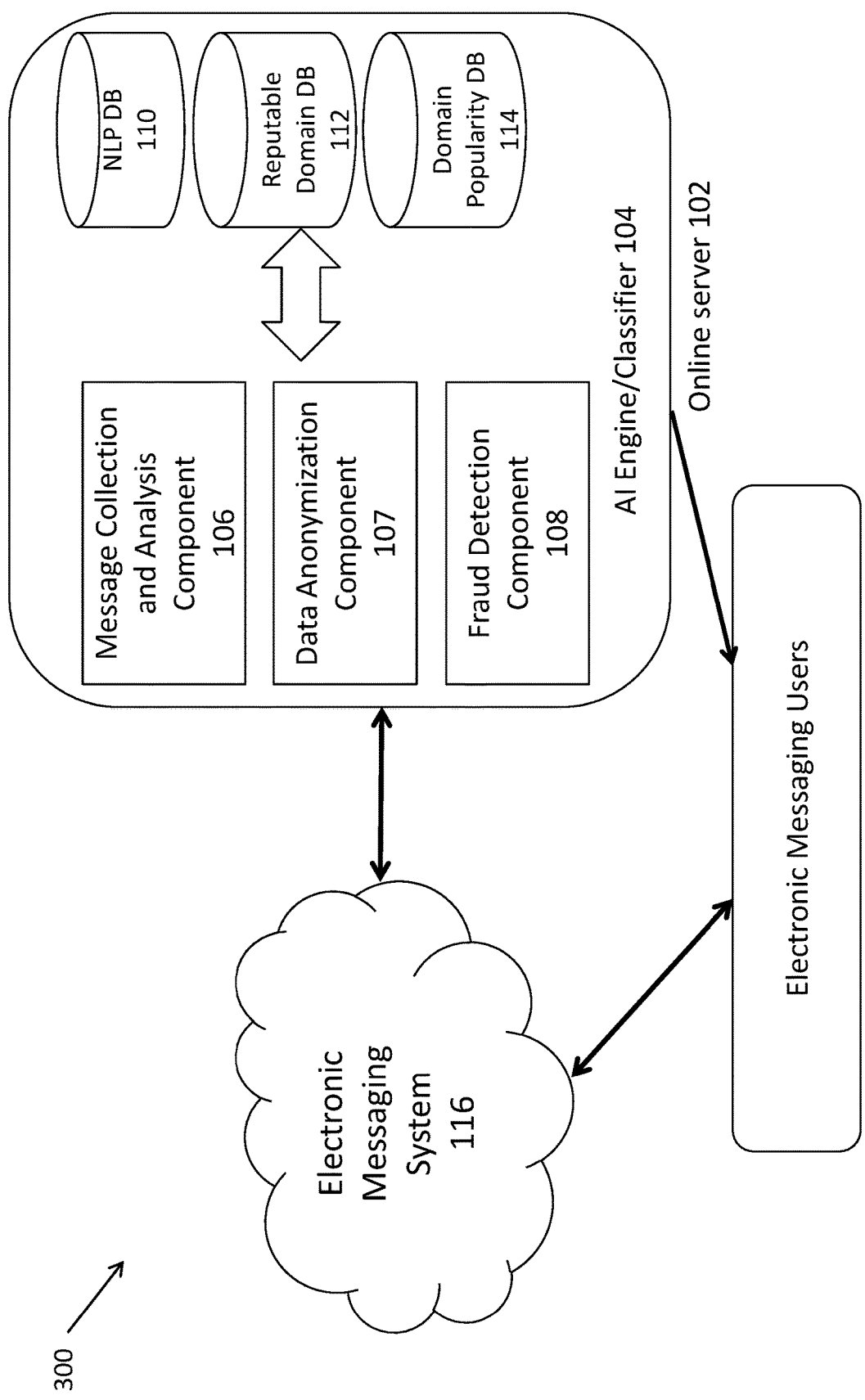
FIG. 3 depicts an example of a system diagram to support user login-based ATO detection via privacy-preserving machine learning in accordance with some embodiments.

FIG. 3 depicts an example of a system diagram 300 to support user login-based ATO detection via privacy-preserving machine learning. In addition to the message collection and analysis component 106 and the fraud detection component 108 depicted in FIG. 1 and discussed above, the AI engine 104 further includes a data anonymization component 107 configured to anonymize data used to train various AI models as discussed in details below.

In the example of FIG. 3, the message collection and analysis component 106 of the AI engine 104 is configured to collect data from the electronic messaging system 116 including all login attempts to accounts of users in an entity on the electronic messaging system 116. For a non-limiting example, the data can be collected from Microsoft Office 365 Azure Active Directory, wherein the data includes all login attempts to Office 365 accounts. In some embodiments, the collected data comprises a plurality of (e.g., up to 20) fields/attributes that provide information about one or more of entity/company, user name, date, device, browser, authentication, and IP address of each login attempt. In some embodiments, personally identifying information (PII) portion of the collected data including names and emails of the users are suppressed by the data anonymization component 107 and only a subset (e.g., 6) of the attributes are utilized by the message collection and analysis component 106 to form a set of possible quasi-identifiers. For a non-limiting example, the quasi-identifiers can be but are not limited to the IP address that each user or employee logged-in from, the entity/organization that the user belongs to, the country where each login attempt is originated, time of the login attempt, the operation result that indicates whether the login attempt was successful or not, and other extended attributes (e.g., Extended Properties) that provide information about the browser, device, and authentication used by the login attempt. In some embodiments, one or more additional attributes may be designated as the sensitive attributes.

In some embodiments, the message collection and analysis component 106 of the AI engine 104 is configured to create an IP reputation model, wherein the IP reputation model relies on a set of features extracted from the collected login attempts to determine reputations of the IP addresses of the login attempts. The reputations of the IP addresses are then utilized by the fraud detection component 108 to classify the users' login attempts. In some embodiments, the set of features are based mainly on statistical data or stats of the features (e.g., IP addresses) extracted by the message collection and analysis component 106 from login attempts to a large number of user accounts across a wide range of entities. In some embodiments, the message collection and analysis component 106 is configured to process the collected data of the login attempts from the electronic messaging system 116 to yield an augmented dataset that provides statistical data of the features (e.g., IP addresses) of the login attempts for training of the ML model discussed below. In some embodiments, the message collection and analysis component 106 is configured to generate the statistical data of the login attempts by grouping the collected data by their IP addresses and aggregating the statistical features of the IP addresses. Each datapoint in the resulting dataset is a distinct IP address and the corresponding columns are the statistical data connected with the IP address. The IP dataset is used to create the IP reputation model discussed above. In some embodiments, the statistical data/stats of the login attempts from each IP address includes but are not limited to one or more of total number of failed login attempts from the IP address (e.g., IPBadLogins), total number of successful login attempts from the IP address (e.g., IPGoodLogins), total number of distinct users with failed login attempts from the IP address (e.g., IPBadUsers), total number of distinct users with successful login attempts from the IP address (e.g., IPGoodUsers), total number of distinct organizations with failed login attempts from the IP address (e.g., IPBadOrgs), and total number of distinct organizations with successful login attempts from the IP address (e.g., IPGoodOrgs). In some embodiments, the message collection and analysis component 106 is configured to parse the set of features/attributes to extract an identification or ID of the user (e.g., user agent) to generate a binary flag, e.g., UserAgentFlag, based on the stats of whether the user is often correlated with ATO attacks or not. The binary flag is set to value 1 if the user agent is suspicious and 0 otherwise.

In some embodiments, the IP reputation model adopts two classes of IP reputation—bad and good. In some embodiments, the message collection and analysis component 106 is configured to collect a set of random samples of IP addresses that are known to be connected with ATO attacks that, e.g., exploit the password spraying behavior, in order to learn how to decide whether an IP address should be deemed as bad or good. Based on these samples and the collected statistical data for these IP addresses discussed above, the message collection and analysis component 106 is configured to train a K-Nearest Neighbor (KNN) model to capture data points of IP addresses with bad reputation for a labeled dataset. In some embodiments, the message collection and analysis component 106 is configured to train another KNN model on a set of random samples of known legitimate logins from IP addresses that are known to be safe for the labeled dataset. The message collection and analysis component 106 is then configured to set criteria represented as a set of rules and split the collected IP addresses into the two classifiers or the labeled dataset(s), the bad or good reputation IP addresses based on the criteria. In some embodiments, the message collection and analysis component 106 is configured to form a dataset/classifier with the corresponding reputation by collecting random samples of user logins that took place from each dataset of bad or good reputation IP addresses. A user login is labelled as fraudulent if it took place from a bad reputation IP address. Otherwise, the user login is labelled as a legitimate login.

In the example of FIG. 3, the data anonymization component 107 of the AI engine 104 is configured to anonymize the labeled dataset of the login attempts used to train the ML model to preserve privacy of the users. In some embodiments, the data anonymization component 107 is configured to apply different variants of data anonymization to the labeled dataset of the login attempts. In some embodiments, the data anonymization component 107 is configured to apply an IP-subnet to hide a portion of the full IP address of each of the login attempts in the labeled dataset. In some embodiments, the data anonymization component 107 is configured to adopt a country attribute to omit and replace the IP address from the labeled dataset. In some embodiments, the data anonymization component 107 is configured to suppress personally identifying information (PII) portion of the collected data including but not limited to names and emails of the users from the labeled dataset used to train the ML model.

In some embodiments, the data anonymization component 107 is configured to compute accuracy, precision, and/or recall for the different variants of data anonymization to determine drop in the ML model's accuracy in detecting fraudulent user login attempts as a result of the dataset anonymization. Any drop in the ML model's accuracy in terms of detecting the ATO attacks as a consequence of the data anonymization can then be measured so that the cost or tradeoff between data anonymization and loss in the ML model's accuracy can be quantified and understood. Based on such tradeoff, the data anonymization component 107 is configured to determine a proper or optimal level of data anonymization based on the ML model's accuracy when trained with different variants of the anonymized data. With the ML model trained with the appropriate level of data anonymization, the AI engine 104 is able to achieve a balance between accuracy of ATO attack detection while preserving user data privacy.

In some embodiments, the fraud detection component 108 of the AI engine 104 is configured to train the ML model for ATO detection using the anonymized dataset/classifier. In some embodiments, the fraud detection component 108 is configured to train the ML model using incomplete (instead of anonymized) dataset of user login attempts for ATO attack detection. In some embodiments, training of the ML model may require the user to set various hyper-parameters, e.g. weights, that govern/tune the ML model's training process. In some embodiments, the labeled dataset is split into training and testing through cross validation, which splits data into training and testing to make sure the designed ML model operates well in real life. In some embodiments, the fraud detection component 108 is configured to determine an optimal set of parameters or features of the labeled dataset for training of the ML model by conducting cross-validation grid search, which takes different sets of data as training and testing over the different combinations of the hyper-parameters. Once the ML model has been trained by the optimal set of parameters of the datasets/classifiers, the ML model for ATO detection can be used for detection of fraudulent new user login attempts. Specifically, when a new login attempt is collected by the message collection and analysis component 106, the fraud detection component 108 is configured to join/combine the IP address of the new login attempt with the features and/or attributes of the set of features previously extracted and analyzed. The fraud detection component 108 is then configured to feed the combined IP address of the new login attempt and the extracted features into the trained ML model to classify the new login attempt and output the determination of the new login attempt to a system administrator.

In some embodiments, the fraud detection component 108 is configured to detect an attack that specifically exploits password spraying, where the attack is able to obtain the credentials of a user to an email account and log in to the user's account to conduct malicious activities (note that the fraud detection component 108 is configured to also detect other more generic types and instances of cyber attacks). Unlike a brute-force attack where one username is used with many password variations, the password-spraying attack combines a large number of usernames with a single password and avoids account lock-out because it looks like a series of isolated failed logins. In some embodiments, the password spraying attack exploits a plurality of user login/credential logs/dumps to find common variations of usernames and passwords in the user credential logs. By timely collecting/extracting the data of the login attempts from a plurality of different user credential logs, the fraud detection component 108 is configured to maintain one or more ML models that detect suspicious logins and alert system administrator accordingly of a password spraying attack.

Figure 4:
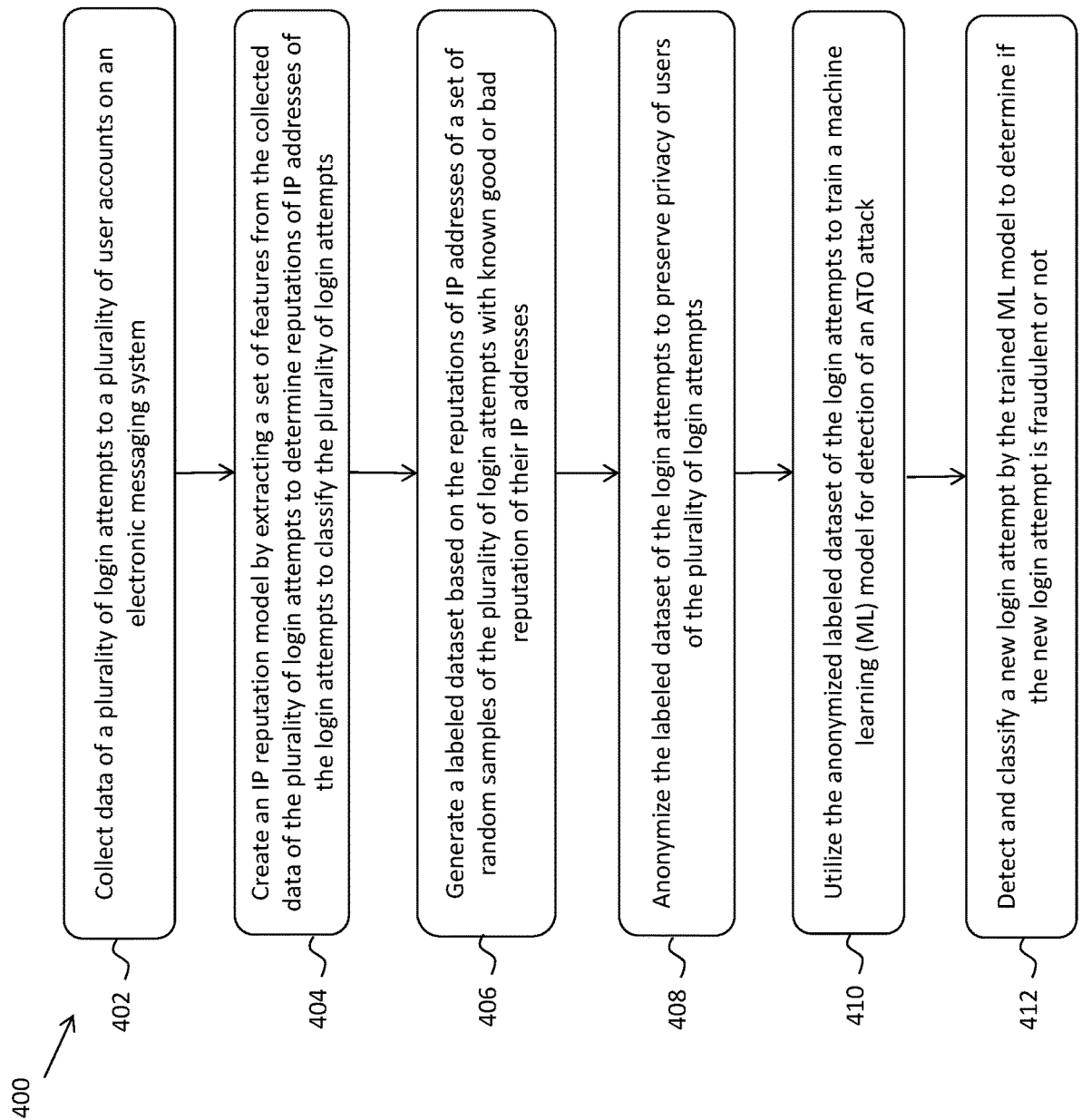
FIG. 4 depicts a flowchart of an example of a process to support user login-based ATO attack detection and monitoring via privacy-preserving machine learning in accordance with some embodiments.

FIG. 4 depicts a flowchart 400 of an example of a process to support user login-based ATO attack detection and monitoring via privacy-preserving machine learning. In the example of FIG. 4, the flowchart 400 starts at step 402, where data of a plurality of login attempts to a plurality of user accounts on an electronic messaging system are collected. The flowchart 400 continues to block 404, where an IP reputation model is created by extracting a set of features from the collected data of the plurality of login attempts to determine reputations of IP addresses of the login attempts to classify the plurality of login attempts. The flowchart 400 continues to block 406, where a labeled dataset is generated based on the reputations of IP addresses of a set of random samples of the plurality of login attempts with known good or bad reputation of their IP addresses. The flowchart 400 continues to block 408, where the labeled dataset of the login attempts is anonymized to preserve privacy of users of the login attempts. The flowchart 400 continues to block 410, where the anonymized labeled dataset of the login attempts is used to train a machine learning (ML) model for detection of account takeover (ATO) attacks. The flowchart 400 ends at block 412, where a new login attempt is detected and classified by the trained ML model in combination with the set of extracted features to determine if the user login attempt is fraudulent or not.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

What is claimed is:

1. A system to support account takeover (ATO) attack detection and monitoring, comprising:
an artificial intelligence (AI) engine running on a host, which in operation, is configured to
collect data of a plurality of login attempts to a plurality of user accounts on an electronic messaging system;
generate a labeled dataset based on reputations of IP addresses of a set of random samples of the plurality of login attempts with known good or bad reputation of their IP addresses;
anonymize the labeled dataset of the plurality of login attempts to preserve privacy of users of the plurality of login attempts;
utilize the anonymized labeled dataset of the plurality of login attempts to train a machine learning (ML) model for detection of an ATO attack, wherein the anonymized labeled dataset of the plurality of login attempts is processed to yield an augmented dataset that provides statistical data of the plurality of login attempts for training of the ML model;
detect and classify a new login attempt by the trained ML model to determine if the new login attempt is fraudulent or not.

2. The system of claim 1, wherein:
the electronic messaging system is one of Office365/Outlook, Slack, LinkedIn, Facebook, Gmail, Skype, Salesforce, and any communication platform configured to send and/or receive the plurality of login attempts to the plurality of user accounts on the electronic messaging system.

3. The system of claim 1, wherein:
each of the users is either a person or a system or a component configured to login to the electronic messaging system.

4. The system of claim 1, wherein:
the AI engine is configured to apply different variants of data anonymization to anonymize the labeled dataset of the login attempts.

5. The system of claim 4, wherein:
the AI engine is configured to apply an IP-subnet to hide a portion of the full IP address of each of the login attempts in the labeled dataset.

6. The system of claim 4, wherein:
the AI engine is configured to adopt a country attribute to omit and replace the IP address from the labeled dataset.

7. The system of claim 4, wherein:
the AI engine is configured to adopt a country attribute to omit and replace the IP address from the labeled dataset.

8. The system of claim 4, wherein:
the AI engine is configured to suppress personally identifying information (PII) portion including names and emails of the users from the labeled dataset.

9. The system of claim 4, wherein:
the AI engine is configured to compute accuracy and/or precision for the different variants of data anonymization to determine drop in the ML model's accuracy in detecting fraudulent login attempts as a result of the dataset anonymization.

10. The system of claim 4, wherein:
the AI engine is configured to determine a proper level of data anonymization based on the ML model's accuracy when trained with different variants of data anonymization.

11. The system of claim 1, wherein:
the AI engine is configured to determine an optimal set of parameters of the labeled dataset for training of the ML model over different combinations of the parameters.

12. The system of claim 1, wherein:
the AI engine is configured to
combine the IP address of the new login attempt with a set of features extracted and analyzed from the collected data of the plurality of login attempts;
feed the combined IP address of the new login attempt and the extracted set features into the trained ML model to classify the new login attempt;
output determination of the new login attempt.

13. A computer-implemented method to support account takeover (ATO) attack detection and monitoring, comprising:
collecting data of a plurality of login attempts to a plurality of user accounts on an electronic messaging system;
generating a labeled dataset based on the reputations of IP addresses of a set of random samples of the plurality of login attempts with known good or bad reputation of their IP addresses;
anonymizing the labeled dataset of the plurality of login attempts to preserve privacy of users of the plurality of login attempts;
using the anonymized labeled dataset of the plurality of login attempts to train a machine learning (ML) model for detection of an ATO attack, wherein the anonymized labeled dataset of the plurality of login attempts is processed to yield an augmented dataset that provides statistical data of the plurality of login attempts for training of the ML model;
detecting and classifying a new login attempt by the trained ML model to determine if the new login attempt is fraudulent or not.

14. The computer-implemented method of claim 13, further comprising:
applying different variants of data anonymization to anonymize the labeled dataset of the login attempts.

15. The computer-implemented method of claim 14, further comprising:
applying an IP-subnet to hide a portion of the full IP address of each of the login attempts in the labeled dataset.

16. The computer-implemented method of claim 14, further comprising:
adopting a country attribute to omit and replace the IP address from the labeled dataset.

17. The computer-implemented method of claim 14, further comprising:
suppressing personally identifying information (PII) portion including names and emails of the users from the labeled dataset.

18. The computer-implemented method of claim 14, further comprising:
computing accuracy and/or precision for the different variants of data anonymization to determine drop in the ML model's accuracy in detecting fraudulent login attempts as a result of the dataset anonymization.

19. The computer-implemented method of claim 14, further comprising:
determining a proper level of data anonymization based on the ML model's accuracy when trained with different variants of data anonymization.

20. The computer-implemented method of claim 13, further comprising:
determining an optimal set of parameters of the labeled dataset for training of the ML model over different combinations of the parameters.

21. The computer-implemented method of claim 13, further comprising:
combining the IP address of the new login attempt with a set of features extracted and analyzed from the collected data of the plurality of login attempts;
feeding the combined IP address of the new login attempt and the extracted set features into the trained ML model to classify the new login attempt;
outputting determination of the new login attempt.

* * * * *